F. B. BOWMAN.
SCISSORS.
No. 27,685.
Patented Apr. 3, 1860.
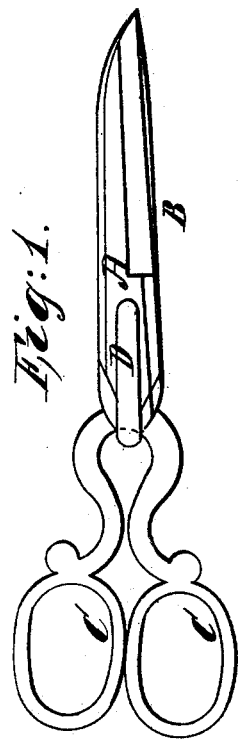
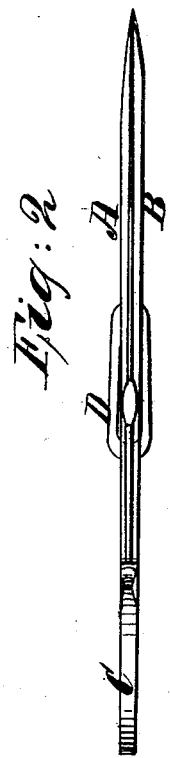
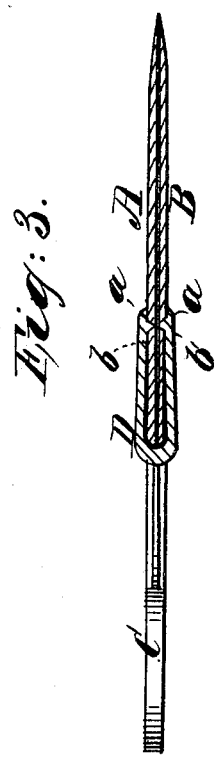
Witnesses:
Fred. Curtis
F. P. Hale
Inventor:
Francis B. Bowman.

UNITED STATES PATENT OFFICE.

FRANCIS B. BOWMAN, OF WALTHAM, MASSACHUSETTS.

SCISSORS.

Specification of Letters Patent No. 27,685, dated April 3, 1860.

*To all whom it may concern:*

Be it known that I, FRANCIS B. BOWMAN, of Waltham, in the county of Middlesex and State of Massachusetts, have invented a new and useful Improvement in Scissors or Shears; and I do hereby declare that the same is fully described and represented in the following specification and the accompanying drawings, of which—

Figure 1, is a side view; Fig. 2, is an edge view, and Fig. 3, a longitudinal section of a pair of shears having my invention. Fig. 4, is a side view of the clasp spring to be hereinafter described.

In the said drawings, A and B, are the two blades; and C, C, the handles of an ordinary pair of scissors. To these, I apply a clasp spring D, made in the form of a fork, the spring being made to embrace the two blades at their fulcrum and so as to press one upon the other and maintain their cutting edges in contact during the operation of closing the blades together or cutting any material with them. In the application of this clasp spring to the two blades and their fulcrum, I prefer to make the fulcrum in two parts or pivots $a$, $a$, and having them affixed to and made to extend from the inner surfaces of the clasp spring in manner as shown in Figs. 3 and 4. These pivots are placed respectively in the usual rivet holes or joint holes $b$, $b$, of the blades, in which case, the length of each pivot should be rather less than the thickness of the blade at the joint hole in order that the clasp spring may act to best advantage in keeping the inner surfaces or cutting edges of the blades in close contact.

The clasp spring may be arranged between the handles and with respect to the blades as shown in the drawings. In this arrangement of it, the handles preserve it from falling downward or into lateral angular position relatively to the blades.

The advantage of the spring combined with the blades will readily be discovered while the scissors may be in use, for it not only prevents the usual looseness, which generally soon arises from wear at the joint in common scissors, but all necessity on the part of the user of forcing the blades laterally in close contact while he may be cutting with the scissors, the only force required to be performed by him being to press the handles toward each other.

I claim—

1. Making the clasp spring with the separate pivots applied to it, and to enter the joint holes of the separate blades as specified.

2. I also claim the arrangement of the clasp spring with respect to the blades and their handles as specified.

FRANCIS B. BOWMAN.

Witnesses:
R. H. EDDY,
F. R. HALE, Jr.